United States Patent [19]
Kawabata

[11] Patent Number: 5,888,021
[45] Date of Patent: Mar. 30, 1999

[54] METHOD AND APPARATUS FOR REMEDIATION OF CONTAMINATED SOIL

[75] Inventor: Yuji Kawabata, Isehara, Japan

[73] Assignee: Canon Kabushiki Kaisha, Tokyo, Japan

[21] Appl. No.: 767,020

[22] Filed: Dec. 16, 1996

[30] Foreign Application Priority Data

Dec. 19, 1995 [JP] Japan .................................... 7-330459

[51] Int. Cl.$^6$ ................................ B09C 1/02; B09C 1/10
[52] U.S. Cl. ........................ 405/128; 166/246; 210/611; 210/747; 435/262.5; 588/205
[58] Field of Search ............................. 166/246; 210/610, 210/611, 747; 405/128; 435/262.5; 588/205, 249

[56] References Cited

U.S. PATENT DOCUMENTS

| | | | |
|---|---|---|---|
| 3,817,331 | 6/1974 | Jones | 166/275 |
| 4,442,895 | 4/1984 | Lagus et al. | 166/308 X |
| 5,032,042 | 7/1991 | Schuring et al. | 405/258 |
| 5,076,357 | 12/1991 | Marquis . | |
| 5,111,883 | 5/1992 | Savery | 166/269 |
| 5,133,625 | 7/1992 | Albergo et al. | 405/263 |
| 5,150,988 | 9/1992 | Powell et al. | 405/128 X |
| 5,334,533 | 8/1994 | Colasito et al. | 435/262.5 X |
| 5,362,400 | 11/1994 | Martinell | 210/747 X |
| 5,384,048 | 1/1995 | Hazen et al. | 435/262.5 X |
| 5,511,907 | 4/1996 | Tabasco | 210/747 X |
| 5,560,737 | 10/1996 | Schuring et al. | 210/747 X |

FOREIGN PATENT DOCUMENTS

| | | |
|---|---|---|
| 0412472 | 2/1991 | European Pat. Off. . |
| 0475227 | 3/1992 | European Pat. Off. . |

*Primary Examiner*—George Suchfield
*Attorney, Agent, or Firm*—Fitzpatrick, Cella Harper & Scinto

[57] ABSTRACT

A method for remedying an environment containing a pollutant using microorganisms comprising a step of injecting a liquid containing a microorganism which can decompose the pollutant into a predetermined site of the environment to be remedied, wherein a gas has been dissolved into or mixed with the liquid by applying a pressure higher than the pressure at the injection site and the liquid evolves the gas when injected into the predetermined site, and an apparatus which comprises a means for injecting a liquid containing a microorganism which can decompose a pollutant into a predetermined site of the environment, wherein the means injects the liquid in which a gas has been dissolved into or mixed with by applying a pressure higher than the pressure at the injection site, into the environment under a pressure so that the gas does not evolve from the liquid before injection.

17 Claims, 1 Drawing Sheet

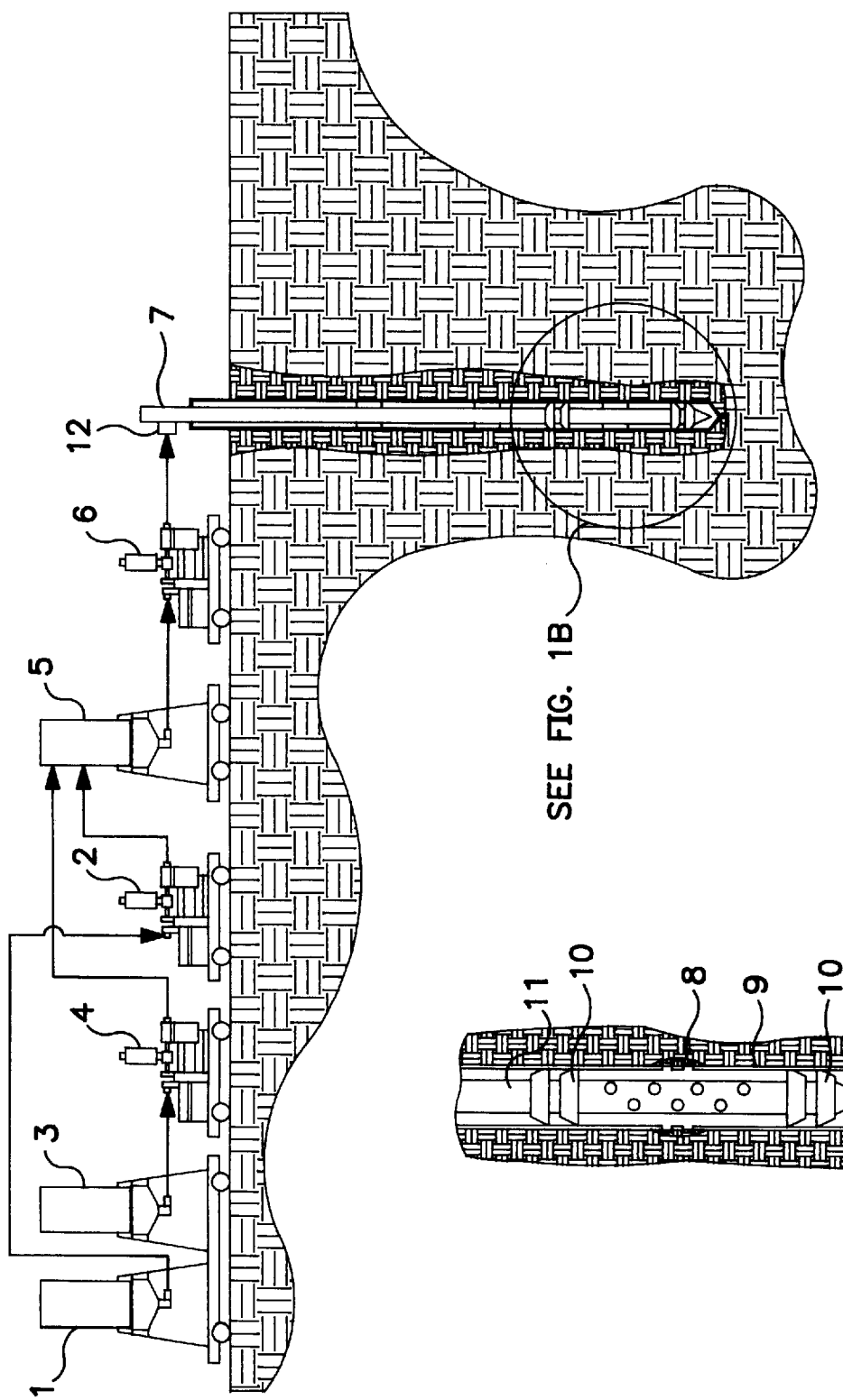

METHOD AND APPARATUS FOR REMEDIATION OF CONTAMINATED SOIL

BACKGROUND OF THE INVENTION

1. Field of the Invention

The present invention relates to a liquid agent for treating contaminated soil, a method for producing the same, and a method for treating soil using the same.

2. Related Background Art

A large amount of chemical compounds or chemical products have been produced with the recent rapid progress in technology and science. Since most of these compounds or products did not originally exist in nature, they are hardly decomposed naturally and thus, accumulate in the natural environment resulting in environmental pollution. In particular, land where many people live is readily affected by artificial pollution. Since water circulates through land, atmosphere and hydrosphere, the environmental pollution in land will spread globally. Well-known examples of pollutants in soil or land include organic compounds such as gasoline, organochloric chemicals such as PCB, teratogenic agrichemicals such as dioxin, as well as radioactive compounds. Fuel such as gasoline is commonly stocked in a huge amount in the underground tanks of gas stations etc. Thus, fuel leak from deteriorated or broken tanks into soil is now a serious social problem. Further, organochloric chemicals, e.g. chlorinated aliphatic hydrocarbons such as trichloroethylene and tetrachloroethylene, were once extensively used for cleaning fine parts as well as for dry cleaning, and large scale pollution of soil and ground water due to the leakage of these chemicals has been gradually revealed. Since such organochloric chemicals are teratogenic and carcinogenic to adversely affect the biological world, purification of the polluted soil or ground water is now an issue to be solved immediately in addition to the isolation of the pollution source.

Methods for remedying soil polluted with these pollutants include, for example, heat treatment of the dug-up soil, vacuum extraction of the contaminant from the polluted soil, and microbial degradation of the pollutant in soil. Although the heat treatment can almost completely remedy the soil, the soil must be dug up so that soil under structures cannot be purified. Moreover, it is unsuitable for large-scale treatment because of the immense costs of digging and heating. Although the vacuum extraction method is a simple and economical purification method, organochloric compounds in a concentration of several ppm or lower cannot be efficiently removed and this remediation process requires time in annual scale. On the other hand, microbial purification does not require dig-up of soil, so it can purify the soil under structures, and use of microorganisms of high degradation activity enables short-time purification. Thus, this economical and effective purification method has been attracting attention lately.

U.S. Pat. No. 5,133,625 discloses a method for efficiently purifying soil using an extensible injection pipe through which the injection pressure, flow rate, and temperature can be determined to control the injection pressure, thus to control the concentrations of microbes and nutrients in the soil. U.S. Pat. Nos. 4,442,895 and 5,032,042 disclose a method of effective in situ microbial remediation of polluted soil, where cracks are formed in the soil using a liquid or a gas injected into the soil with pressure from an injection well. U.S. Pat. No. 5,111,883 discloses a method for injecting chemicals vertically or horizontally into a limited region of the soil by setting the relative position of the injection and extraction wells.

Injection of a pollutant-decomposing microorganism, nutrients, an inducer, oxygen, and other chemicals into the soil is considered to be essential for the microbial remediation of polluted soil. However, according to the conventional injection methods, an extremely large amount should be injected to remedy a wide area, since the liquid agent is injected from the injection element to fill the soil pore space. Such a process increases the processing period, labor and material costs, resulting in increased remediation expenses. Differing from chemicals, microorganisms can spontaneously grow and multiply when certain growth conditions such as nutrient are satisfied. If a liquid agent containing the microorganism and nutrient can be injected in an amount as small as possible into a wide area of soil and the microorganism can grow in the soil to decompose pollutants, the purification expenses is considerably decreased. However, when the necessary amount of the microorganism and nutrient is injected into a wide area after dilution, the processing period and labor required for injection do not decrease. Further, such a method that the liquid agent will fill most of the soil pore space may cause soil fluidization and soften the ground with a high possibility, it cannot be applied to the soil under heavy structures. Moreover, the liquid agent injected into the soil penetrates into the deeper layers and diffuses into underground streams. Therefore, mobile microorganisms and nutrients will not remain within the desired area and are lost. Thus, reinjection is required, making it difficult to remedy soil at a low cost. Further, the runoff of the microorganisms and nutrients may cause secondary environmental pollution. Consequently, in microbial soil purification, a method for injecting using a small amount of the agent into a wide area of soil is required without filling all the pore space of the soil.

SUMMARY OF THE INVENTION

The present invention was made to overcome the above problems, and the object of the present invention is to provide a method for effectively remedying polluted soil, in which a treating liquid agent is distributed over a wide area by injecting a reduced quantity of the liquid agent into the soil.

One aspect of the present invention is a method for remedying an environment containing a pollutant using microorganisms, which comprises a step of injecting into a predetermined site of the environment to be remedied a liquid containing a microorganism which can decompose said pollutant, wherein the liquid evolves gas when injected into the environment.

Another aspect of the present invention is a method for remedying a soil environment containing a pollutant using a microorganism, which comprises a step of injecting into a predetermined site of the environment to be remedied a liquid containing a microorganism which can decompose the pollutant, wherein a gas has been dissolved into the liquid by applying a pressure higher than the pressure at the predetermined site and the liquid evolves gas when injected into the predetermined site.

The other aspect of the present invention is a method for remedying a soil environment containing a pollutant using a microorganism, which comprises a step of injecting into a predetermined site of the environment to be remedied a liquid containing microorganisms which can decompose the pollutant, wherein a gas has been mixed in the liquid by applying a pressure higher than the pressure at the predetermined site and the liquid evolves gas when injected into the predetermined site.

The other aspect of the present invention is an apparatus for use in a process for remedying an environment containing a pollutant using microorganisms, the process comprising the step of injecting a liquid into a predetermined site of the environment to be remedied, the liquid containing a microorganism capable of degrading the pollutant and a gas dissolved or mixed into the liquid by applying a first pressure being the same as or higher than a pressure at the site, the apparatus comprising a tank for retaining the liquid, and a pipe for leading the flow of said liquid from the tank to the site, and a pump for applying a second pressure to the liquid in order to inject the liquid into the site, wherein the second pressure is the same as or higher than the first pressure.

Further aspect of the present invention is a method for injecting and diffusing a liquid into an environment which comprises a step of injecting the liquid into a predetermined site of the environment, wherein the liquid evolves a gas when injected into the predetermined environmental site.

Still further aspect of the present invention is an apparatus for use in a process for injecting a liquid into an environment, the process comprising the step of injecting a liquid into a predetermined site of the environment, the liquid containing a gas dissolved or mixed into the liquid by applying a first pressure being the same as or higher than a pressure at the site, the apparatus comprising a tank for retaining the liquid, and a pipe for leading the flow of said liquid from the tank to the site, and a pump for applying a second pressure to the liquid in order to inject the liquid into the site, wherein the second pressure is the same as or higher than the first pressure.

BRIEF DESCRIPTION OF THE DRAWINGS

FIG. 1A is a schematic view of an apparatus for treating soil in accordance with an embodiment of the present invention, and FIG. 1B is an enlarged view of the circled area of FIG. 1A.

DESCRIPTION OF THE PREFERRED EMBODIMENTS

When a liquid agent containing a microorganism and/or nutrients is injected into soil, the penetration range of the liquid agent depends on the coefficient of permeability of the soil and the injected volume. For example, in a sand layer having a large coefficient of permeability, the liquid agent almost spherically diffuses from the injection port to fill the soil space. The spherical size is determined by the injected volume and the coefficient of permeability. A part of the injected liquid agent spontaneously falls downwards by its own weight. In a loam layer having a small coefficient of permeability, the injected liquid agent diffuses like veins along weaker soil structure. In both cases, the diffusion speed of the liquid agent rapidly decreases in accordance with the distance from the injection port. For example, when a liquid agent is injected into a sand layer having a porosity of 37% at a flow rate of 40 liter/min, the linear velocity of diffusion of the liquid agent at a point 1 m from the injection port is less than 3 cm/min.

In order to extend the diffusion distance of the injected liquid agent from the injection port, it is preferable to prevent the decrease in diffusion speed of the liquid agent in the soil. For that purpose, one means is to apply a driving force for the diffusion of the liquid agent in the soil. The driving force can be applied, for example, by gas evolution from the liquid agent itself at the injection site in the soil environment. Since this method comprises only the step of liquid agent injection which applies a driving force to the liquid agent, it enables very effective soil remediation.

One method for evolving gas from the liquid agent injected into a predetermined site in the soil environment is, for example, to dissolve and/or mix a gas to be evolved into the liquid agent by applying a pressure (the first pressure) higher than that of the predetermined injection site in the soil environment. When such a liquid agent is injected into the soil environment, the gas having been dissolved into and/or mixed with the liquid agent evolves from the liquid agent in accordance with the decrease of the pressure applied to the agent to apply a driving force to the liquid agent. As a result, the liquid agent is accelerated to reach far away from the injection port.

The gas to be dissolved into and/or mixed with the liquid agent includes, but not limited to, air, oxygen, carbon dioxide, nitrogen, helium, neon, argon, carbon monoxide, nitrogen dioxide and sulfur dioxide. A gas having a high solubility to the liquid agent is preferable, since the gas volume evolved when the agent is injected into the soil environment can be rather easily increased, resulting in a greater driving force. A typical example of such a gas is carbon dioxide. For example, when 100 liters of an aqueous agent, in which carbon dioxide has been dissolved under a pressure of 25 $kg/cm^2$, is injected into a site in the soil environment (20° C.), 10 m deep from the surface where the hydrostatic pressure is 2 $kg/cm^2$, 800 liters of carbon dioxide evolve at the site. When 100 liters of the liquid agent is simply injected into the soil, the sphere of water-filled soil has a radius of 50 cm from the injection port immediately after the injection. With the gas evolution, the radius of the diffusion sphere is increased up to 100 cm.

When a pollutant is decomposed by an aerobic microorganism, oxygen or air is preferably used since such a gas not only applies a driving force to the liquid agent but also is utilized for biodegradation of the pollutant. For example, when 100 liters of an aqueous agent, in which air is dissolved under a pressure of 50 $kg/cm^2$, is injected into a site in the soil environment (20° C.), 10 m deep from the surface where the hydrostatic pressure is 2 $kg/cm^2$, approximately 40 liters of air evolve at the site. When 100 liters of water into which air has not been pressure-dissolved is injected into the soil, the radius of the sphere of water-filled soil from the injection port is 50 cm, but with gas evolution, it can be increased up to 53 cm. When oxygen is used instead of air, approximately 60 liters of oxygen evolves, and the radius of the diffusion domain becomes 57 cm.

A foaming agent can also apply a driving force to the liquid agent, evolving gas when released into the soil. Foaming agents that foam at a relatively low temperature are preferably used. Examples of preferred foaming agents include inorganic foaming agents, e.g. sodium hydrogen carbonate, ammonium carbonate, and ammonium nitrite; and organic foaming agents, e.g. diazoaminobenzene. In order to accelerate foaming, a liquid agent containing a foaming agent may come in contact with an accelerator, e.g. an acid, when being injected.

The liquid agent may include, for example, a microorganism being able to decompose chemical pollutants, a growth agent used for microbial growth, an activity-supporting agent required for decomposition activity expression, a survival agent required for stable microbial inhabitation, a diffusion agent for promoting diffusion of the above materials, a channel forming agent for enhancing diffusion of the liquid agent into the soil, and an indicator for monitoring the diffusion of the liquid agent into the soil.

These materials may be used alone or in combination in the liquid agent to be injected.

Examples of microorganisms which can decompose chemical pollutants include those of genera Saccharomyces, Hansenula, Candida, Micrococcus, Staphylococcus, Streptococcus, Leuconostoc, Lactobacillus, Corynebacterium, Arthrobacter, Bacillus, Clostridium, Neisseria, Escherichia, Enterobacter, Serratia, Achromobacter, Alcaligenes, Flavobacterium, Acetobacter, Nitorosomonas, Nitorobacter, Thiobacillus, Gluconobacter, Pseudomonas, Xanthomonas, and Vibrio.

The growth agent means a nutrient for the microorganism, using which the microorganism grows to decompose the chemical substance in soil. As a useful growth agent, there are bouillon, M9, Malt Extract, MY, or a selective medium for nitrifying bacteria. When the degrading enzyme is constitutively expressed in the microorganism, the activity-supporting agent is not necessary. When the expression of the enzyme requires a specific inducer, such an inducer must be added as the activity-supporting agent. Examples of inducers include methane for methane-oxidizing bacteria; toluene, phenol and cresol for aromatic-assimilating bacteria; ammonium salts for nitrifying bacteria. Decomposing enzymes can also be directly used for remedying polluted soil. In such a case, an energy source or minerals required for the enzyme activity must be added as the activity-supporting agent.

The survival agent provides a habitat for the useful microorganism, preventing predation by other microorganisms and small animals, or diffusion into ground water. Any microorganism-carriers used for bioreactors in medical or food industries and waste water treatment can be used as a survival agent. Examples of survival agent include particulate carriers, e.g. porous glass, ceramics, metal oxides, activated charcoal, kaolinite, bentonite, zeolite, silica gel, alumina and anthracite; gel carriers, e.g. starch, agar, chitin, chitosan, polyvinyl alcohol, alginic acid, polyacrylamide, carrageenan, agarose, and gelatin; polymer resins and ion exchange resins, e.g. cellulose, glutaraldehyde, polyacrylic acid and urethane polymers. Further, natural and synthetic polymer compounds, e.g. cellulose products such as cotton and hemp, pulp paper, polymeric acetate which is a modified natural product, and polyester and polyurethane cloths can be also used in the present invention. Compost is a useful material which acts as both a growth agent and a survival agent. Examples of compost materials include straw, sawdust, rice bran, bagasse, and crab and lobster shells.

Examples of channel forming agents include surfactants, e.g. sodium dodecyl sulfate and TRITON-X™ ($C_8H_{17}$-$C_6H_4$-$CH_2CH_2)_{10}$-$C_{18}H_{35}$ ) and foaming agents, e.g. sodium hydrogen carbonate and ammonium carbonate. It is preferred that the indicator readily dissolves or disperses in the liquid agent and readily detected at the migration point when it migrates with the liquid agent. Examples of indicators include water-soluble pigments which changes the color of the soil, and organic acids and salts for changing the electroconductivity of the soil.

An example of a liquid agent injection apparatus and a method of the present invention for treating the soil using it will now be illustrated with reference to FIGS. 1A and 1B. The liquid agent injection apparatus comprises a gas reservoir 1 which contains a gas to be pressuredissolved in or pressure-mixed with the liquid agent under pressure application, a pressure pump 2 for pressurizing the gas, a liquid agent reservoir 3 containing the liquid agent, a transferring pump 4 for the liquid agent, a liquid agent reservoir 5 for containing the liquid agent in which the gas is dissolved or mixed, a transferring pump 6 which transports the liquid agent in the reservoir 5, and an injection pipe 7 for leading a flow of the liquid agent from the reservoir to the site at which the liquid agent is injected. The amount of the gas to be dissolved into the liquid agent can be adjusted using the pressure pump 2. The volume ratio of the gas to the liquid agent is determined by the flow rate ratio of the pressure pump 2 to the transferring pump 4. Alternatively, the gas from the pressure pump 3 and the liquid agent from the transferring pump 4 may be mixed directly and injected through the injection pipe 7, without passing through the reservoir 5 and the transferring pump 6. A foaming agent may be dissolved in or mixed with the liquid agent in the reservoir 5, if necessary. As the injection pipe, it can be used a single pipe having an opening at the end or openings on the side. When the injection process is repeated at various depth, it is preferable to use a manchette tube 9 with a rubber sleeve 8 in combination with a sleeve pipe 11 with a packer 10. The sleeve pipe 8 is vertically moved and the upper and lower packers 10 are expanded at a predetermined site. The sleeve pipe 11 is passed through between the upper and lower packers to feed the liquid agent, and the liquid agent is injected from the rubber sleeve 8. It is preferred that the injection pressure (second pressure) of the liquid agent into the soil is the same as or higher than the pressure used to dissolve or mix the gas, in order to prevent gas evolution before injection.

Although the present invention has been illustrated above in view of environmental remediation, the present invention is not limited to this illustration. For example, the present invention is also applicable to the injection and diffusion of desired materials, e.g. fertilizers for plants, into the environment.

As set forth above, this method applies a driving force to the injected liquid agent by gas evolution due to the gas previously pressure-dissolved in or mixed with the liquid agent with pressure application, or formed from a foaming agent, whereby the liquid agent can be diffused and distributed over a wide soil range not filling almost all pore space in the soil with the liquid. Since the water content of the soil is not raised to the saturation after injection, the liquid agent hardly falls downwards due to its own weight, reducing the loss of the microorganism and nutrient, so that secondary pollution. Further, when a gas which is essential for the growth of the microorganism, for example oxygen or methane, is used, the microbial injection and gas feeding for the microorganism can be achieved simultaneously.

The present invention will be further illustrated by reference to the following examples but not for limitation purposes.

EXAMPLE 1

Injection of a homogeneous solution containing pressure-dissolved air (1) A 5 cubic-meter concrete vessel was filled with fine sand as a model test soil. The porosity and water content of the fine sand were 30% and 10%, respectively. At the central surface of the vessel, a hole was drilled, and a manchette tube 9 as an injection pipe of 50 mm in outer diameter having a rubber sleeve 8 was inserted so that the injection port was located at a depth of 2.5 m from the surface. The gap between the drilling hole and the injection pipe was sealed with a viscous material consisting of fine sand and water glass. The upper end of the injection pipe connects to a pump 6 through a valve 12 on the ground. A solution in a reservoir 5 is transferred to the injection port under pressure after gas solubilization. The solution used for the injection was a 0.01 M fluorescein aqueous solution.

Water content was determined as follows: Exactly 100 cm$^3$ of a soil sample was weighed as weight W1 (g). The sample was dried to a constant weight in a dryer at 110° C., cooled in a desiccator, and weighed as weight W2 (g). The water content was calculated using the equation $((W1-W2)/W1) \times 100$.

Porosity was determined as follows: The true density of the soil was measured using a pycnometer (2.70 g/cm$^3$). The volume corresponding to the water content in the soil was calculated using the equation (W1-W2), and the true volume of the soil was calculated using the equation W2/2.70. Finally, the porosity was calculated using the equation $(100-(W1-W2)-(W2/2.70))/100$.

(2) The reservoir 5 was filled with 200 liters of the solution, and air which was pressurized to 50 kg/cm$^2$ with the pressure pump 2 was fed into and dissolved into the solution. The entire solution was injected from the injection port under pressure. The model test soil was dug out and each diffusion distance in four horizontal directions from the injection port were determined by identifying the fluorescein fluorescence. The average of the diffusion distances was determined. The water content at the middle point of each injection distance was determined by the above dry-weight method.

(3) Results of the injection distance and water content, as well as the average thereof, are summarized in Table 1. The average injection distance of the solution with pressure-dissolved air and the water content of the soil were 85 cm and 14%, respectively.

EXAMPLE 2

Injection of a homogeneous solution containing pressure-dissolved carbon dioxide (1) Using the same equipment as Example 1, to 200 liter of a 0.01 M fluorescein aqueous solution in the reservoir 5, carbon dioxide pressurized to 25 kg/cm$^2$ with the pressure pump 2 was introduced and dissolved. After the entire solution was injected from the injection port under pressure, the model test soil was dug out and each diffusion distance in four horizontal directions from the injection port were determined by identifying the fluorescein fluorescence. The average of the diffusion distances was determined. The water content at the middle point of each injection distance was determined by the above dry-weight method.

(2) Results of the injection distance and water content, as well as averages thereof, are summarized in Table 1. The average injection distance of the solution with pressure-dissolved carbon dioxide and the water content of the soil were 187 cm and 10%, respectively.

COMPARATIVE EXAMPLE 1

Injection of a homogeneous solution without pressure-dissolved air (1) Using the same equipment as Example 1, 200 liters of a 0.01 M fluorescein aqueous solution was fed into the reservoir 5. After the entire solution was injected from the injection port under pressure, the model test soil was dug out and each diffusion distance in four horizontal directions from the injection port were determined by identifying the fluorescein fluorescence. The average of the diffusion distances was determined. The water content at the middle point of each injection distance was determined by the above dry-weight method.

(2) Results of the injected distance and the water content, as well as the average thereof, are summarized in Table 1. The average injection distance of the solution without solubilized air and the water content of the soil were 68 cm and 17%, respectively, showing that a homogeneous solution can be injected over a wide range without substantial increase in the soil water content by means of pressure-dissolved gas such as air or carbon dioxide.

TABLE 1

Injection Distance and Water Content

| | Injection Distance(cm) | | | Water content(%) | | |
|---|---|---|---|---|---|---|
| Sample | Example 1 | Example 2 | Comparative Example 1 | Example 1 | Example 2 | Comparative Example 1 |
| 1 | 87 | 190 | 70 | 15 | 10 | 19 |
| 2 | 85 | 188 | 69 | 14 | 10 | 17 |
| 3 | 84 | 185 | 69 | 14 | 10 | 16 |
| 4 | 84 | 184 | 65 | 13 | 9 | 16 |
| Average | 85 | 187 | 68 | 14 | 10 | 17 |

EXAMPLE 3

Injection of a microorganism solution containing pressure-dissolved air (1) Strain J1 (National Institute of Bioscience and Human Technology: FERM BP-5102) was cultured to 10$^9$/ml. An injection solution of 10$^7$/ml was prepared by 100-fold dilution of the culture.

(2) With the same equipment as Example 1, 200 liters of the injection solution was put in the reservoir 5, and air was introduced in the reservoir 5 under a pressure of 50 kg/cm$^2$ and dissolved into the solution. After the entire solution was injected from the injection port under pressure, the model test soil was dug out samples were taken in four horizontal directions from the injection port. Then a fluorescein-labeled antibody to strain J1 was added to each sample, and the number of J1 was determined by flow cytophotometry. The injection distance was determined as a distance from the injection port at which the number of bacteria became 10$^3$/g dry soil.

(3) The results of the injection distance and the average are summarized in Table 2. The injection distance of the bacteria-containing solution with pressure-dissolved air was 68 cm.

COMPARATIVE EXAMPLE 2

Injection of a bacterial solution without pressure-dissolved air (1) Using the same equipment as Example 3, 200 liters of the injection solution (containing strain J1, 10$^7$/ml) was put into the reservoir 5, and the solution was injected from the injection port under pressure for 6 minutes at an injection rate of 30 liters/min. The model soil was dug out and samples were collected from the soil in the four horizontal directions from the injection port. The J1 antibody labelled with fluorescein was added to each sample and the number of bacteria was determined by flow cytophotometry. The injection distance was determined as a distance from the injection port at which the number of bacteria became 10$^3$/g dry soil.

(2) The results of the injection distance and the average are summarized in Table 2. The injection distance of the bacterial solution without pressure-dissolved air was 55 cm. The results demonstrate that the bacterial solution can be diffused over a wide range by pressure-dissolved gas such as air.

TABLE 2

Injection Distance of Bacterial Solution with Pressure-dissolved Air

| | Injection Distance(cm) | |
|---|---|---|
| Sample | Example 3 | Comparative Example 2 |
| 1 | 70 | 58 |
| 2 | 68 | 55 |
| 3 | 68 | 54 |
| 4 | 65 | 54 |
| Average | 68 | 55 |

EXAMPLE 4

Injection of homogeneous solution containing foaming agent (1) Using the same equipment as Example 1, 100 liters of aqueous solution containing 0.01 M fluorescein and 1.0 weight percent of sodium hydrogen carbonate was put into the reservoir 3 as injection solution 1. Into a similar reservoir, 100 liters of a 0.12 M aqueous solution of hydrochloric acid was put as an injection solution 2. The injection solutions 1 and 2 were injected into the soil by the two-shot method using a double-pipe rod and two pumps 4, so that gaseous carbon dioxide was generated when the injection solutions were mixed in the soil. The model soil was dug out and each diffusion distance in four horizontal directions from the injection port were determined by identifying the fluorescein fluorescence. The average of the diffusion distances was determined. The water content at the middle point of each injection distance was determined by the above dry-weight method.

(2) Results of the injection distance and water content, as well as the average thereof, are summarized in Table 3. The average injection distance of the solution and the water content of the soil were 79 cm and 15% respectively. The results demonstrate that the homogeneous solution can be diffused over a wide range by the addition of a foaming agent without significantly increasing the water content of the soil.

EXAMPLE 5

Injection of homogeneous solution containing pressure-mixed air (1) Using the same equipment as Example 1, 200 liters of an injection solution (aqueous solution containing 0.01 M fluorescein) was put into the reservoir 5, air pressurized to 5 kg/cm$^2$ with the pressure pump 2 was introduced into the reservoir 5 and mixed with the solution in order to prepare an injection solution containing pressurized bubbles. The volume ratio of the injection solution to air was approximately 10:1. The entire injection solution was injected from the injection port into the soil under pressure. The model test soil was dug out and each diffusion distance in four horizontal directions from the injection port were determined by identifying the fluorescein fluorescence. The average of the diffusion distances was determined. The water content at the middle point of each injection distance was determined by the above dry-weight method.

(2) Results of the injection distance and water content, as well as the averages thereof, are summarized in Table 3. The average injection distance of the solution containing pressure-mixed air was 78 cm. The results demonstrate that the homogeneous solution can be diffused over a wide range by pressure-mixed air without significantly increasing the water content of the soil.

EXAMPLE 6

Injection of bacterial solution containing pressure-mixed air (1) With the same equipment as Example 3, 200 liters of the injection solution (containing strain J1, 10$^7$/ml) was fed into the reservoir 5, and air pressurized to 5 kg/cm$^2$ with the pressure pump 2 was introduced in the reservoir 5 and mixed into the solution. An injection solution containing pressurized bubbles was prepared by mixing the solution and air. The ratio of the injection solution to air was approximately 10:1. After the entire solution was injected from the injection port under pressure, the model soil was dug out and the samples were collected from the soil in the four horizontal directions from the injection port. The J1 antibody labelled with fluorescein was added to each sample, and the cell number was determined by flow cytophotometry. The injection distance was determined as the distance from the injection port at which the number of bacteria became 10$^3$/g dry soil.

(2) The results of the injection distance and the average are summarized in Table 3. The injection distance of the bacterial solution containing pressure-mixed air was 64 cm. The results illustrate that the bacterial solution can diffuse over a wide range due to the pressure-mixed air.

TABLE 3

Injection distance and water content with liquid agent containing foaming agent or pressure-mixed air

| | Injection Distance ( cm) | | | Water content(%) | | |
|---|---|---|---|---|---|---|
| Sample | Example 4 | Example 5 | Example 6 | Example 4 | Example 5 | Example 6 |
| 1 | 81 | 80 | 66 | 16 | 16 | — |
| 2 | 79 | 78 | 65 | 16 | 15 | — |
| 3 | 78 | 77 | 63 | 15 | 15 | — |
| 4 | 77 | 77 | 62 | 14 | 14 | — |
| Average | 79 | 78 | 64 | 15 | 15 | — |

EXAMPLE 7

Effective wide range soil remediation using a microorganism (1) A concrete vessel was filled with a model soil as in Example 1. An aqueous trichloroethylene solution was sprinkled over the model soil to prepare a polluted soil having a trichloroethylene concentration of 10 ppm. The injection pipe and the transferring pump were provided as in Example 1.

(2) Strain J1 was cultured to a concentration of 10$^9$/ml, and 100-fold diluted with an aqueous solution containing 0.1% yeast extract, 0.2% sodium lactate and 100 ppm phenol to prepare an injection solution (10$^7$/ml).

(3) The reservoir 5 was filled with 200 liters of the injection solution, and air pressurized to 50 kg/cm$^2$ with the pressure pump 2 was introduced to the reservoir 5 and pressure-dissolved into the injection solution. The entire volume of the injection solution was fed from the injection port under pressure for the remediation test. The model soil was dug out five days after and samples were collected from the soil in four horizontal directions of diffusion from the injection port. The trichloroethylene concentrations in the samples were determined by gas chromatography. The results illustrate that the trichloroethylene concentration within 70 cm from the injection port decreased to approximately 1 ppm. Thus, air pressure-dissolved into the injection solution under pressure enables a wider range of bacterial solution diffusion, and effective remediation of the soil.

What is claimed is:

1. A method for remedying an environment containing a pollutant using microorganisms comprising a step of injecting a liquid containing a microorganism which can decompose the pollutant, into a predetermined site of the environment to be remedied, wherein the liquid evolves gas when injected into the environment.

2. A method for remedying an environment according to claim 1, wherein the gas is dissolved into the liquid by applying a pressure higher than the pressure at the predetermined environmental site.

3. A method for remedying an environment according to claim 2, wherein the gas is selected from the group consisting of air, oxygen, carbon dioxide, hydrogen, helium, neon, argon, carbon monoxide, methane, nitrogen monoxide, nitrogen dioxide, and sulfur dioxide.

4. A method for remedying an environment according to claim 3, wherein the gas is air or oxygen.

5. A method for remedying an environment according to claim 1, wherein the gas is mixed with the liquid by applying a pressure higher than the pressure at the predetermined environmental site.

6. A method for remedying an environment according to claim 5, wherein the gas is selected from the group consisting of air, oxygen, carbon dioxide, hydrogen, helium, neon, argon, carbon monoxide, methane, nitrogen monoxide, nitrogen dioxide, and sulfur dioxide.

7. A method for remedying an environment according to claim 6, wherein the gas is air or oxygen.

8. A method for remedying an environment according to claim 1, wherein the liquid contains a foaming agent.

9. A method for remedying an environment according to claim 8, wherein the foaming agent is an inorganic foaming agent.

10. A method for remedying an environment according to claim 9, wherein the inorganic foaming agent is selected from the group consisting of sodium hydrogen carbonate, ammonium carbonate and ammonium nitrite.

11. A method for remedying an environment according to claim 8, wherein the foaming agent is an organic foaming agent.

12. A method for remedying an environment according to claim 11, wherein the organic foaming agent is diazoaminobenzene.

13. A method for remedying an environment according to one of claims 8 to 11, wherein the foaming agent evolves gas by the reaction with an acid.

14. A method for remedying an environment according to claim 13, wherein the acid is supplied to the predetermined site.

15. A method for remedying an environment according to claim 8, wherein the environment is a soil environment.

16. A method for remedying an environment containing a pollutant using microorganisms comprising a step of injecting a liquid containing a microorganism which can decompose the pollutant into a predetermined site of the environment to be remedied, wherein the liquid further contains a gas having been dissolved into the liquid by applying a pressure higher than the pressure at the predetermined site, and evolves the gas when injected into the predetermined site.

17. A method for remedying a soil environment containing a pollutant using microorganisms comprising a step of injecting a liquid containing a microorganism which can decompose the pollutant, into a predetermined site of the environment, wherein the liquid further contains a gas mixed by applying a pressure higher than the pressure at the predetermined site and evolves the gas when injected into the predetermined site.

* * * * *

UNITED STATES PATENT AND TRADEMARK OFFICE
CERTIFICATE OF CORRECTION

PATENT NO. : 5,888,021

DATED : March 30, 1999

INVENTOR(S): YUJI KAWABATA

It is certified that error appears in the above-identified patent and that said Letters Patent is hereby corrected as shown below:

TITLE PAGE:

Attorney, Agent, or Firm:

"Fitzpatrick, Cella Harper & Scinto" should read --Fitzpatrick, Cella, Harper & Scinto--.

Column 2:

Line 16, "is" should read --are--.
    Line 32, "is required" should be deleted.
    Line 33, "soil." should read --soil is required.--.

Column 4:

Line 16, "not" should read --is not--.

Column 5:

Line 10, "Nitorosomonas, Nitorobacter," should read --Nitrosomonas, Nitrobacter,--.
    Line 50, "-CH$_2$CH$_2$)$_{10}$" should read --(OCH$_2$CH$_2$)$_{10}$--.
    Line 53, "readily" should read --is readily--.
    Line 63, "pressuredissolved" should read --pressure dissolved--.

UNITED STATES PATENT AND TRADEMARK OFFICE
CERTIFICATE OF CORRECTION

PATENT NO. : 5,888,021

DATED : March 30, 1999

INVENTOR(S) : YUJI KAWABATA

It is certified that error appears in the above-identified patent and that said Letters Patent is hereby corrected as shown below:

Column 6:

Line 17, "depth" should read --depths,--.
    Line 44, "so that" should read --and--.

Column 7:

Line 37, "200 liter" should read --200 liters--.

Column 8:

Line 38, "out" should read --out, and--.

Signed and Sealed this

Twenty-eighth Day of September, 1999

*Attest:*

Q. TODD DICKINSON

*Attesting Officer*        *Acting Commissioner of Patents and Trademarks*